Patented July 4, 1950

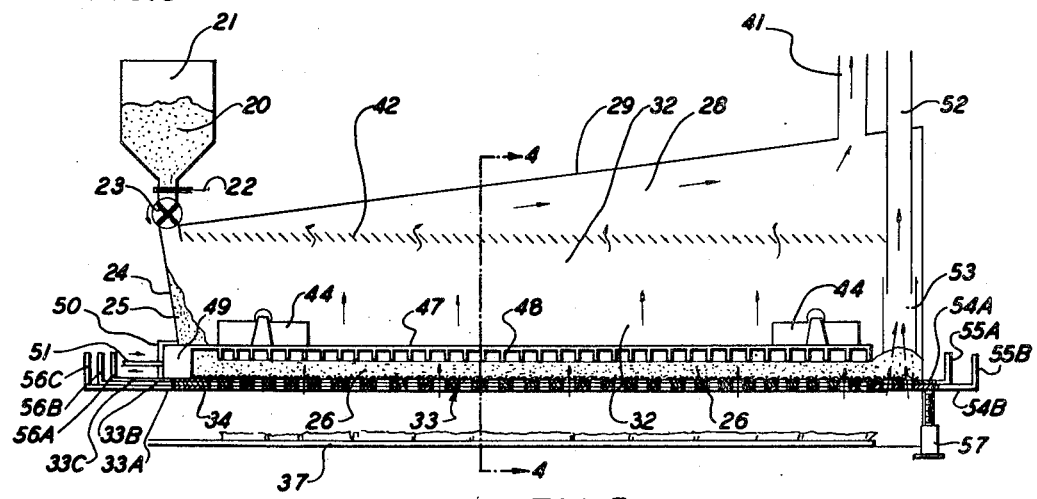

2,513,369

UNITED STATES PATENT OFFICE 2,513,369

DRYING BY FLUIDIZATION OF THE WORK

Paul A. Shaw, San Pedro, Calif., assignor to Terminal Island Sea Foods, Ltd., Terminal Island, Calif., a corporation of California Application July 2, 1946, Serial No. 680,874

10 Claims. (Cl. 34—10)

1

This invention is concerned with drying relatively light, finely divided materials, particularly those which tend to alter or deteriorate at high temperatures, and provides improvements in methods and apparatus for such drying. It is applicable generally to the dehydration of finely divided solids of relatively low bulk density, say in the neighborhood of one or less, and offers advantages in the treatment of a great variety of materials, including those which are unaltered at relatively high temperatures. Its greatest field of application, however, is in the drying of products such as fish meal, peat moss, rice, vegetable chips, sewage sludge and other materials which tend to deteriorate if dried at excessive temperatures or even if dried slowly at moderate temperatures.

Fish meal (to take an example of a substance to which the invention may be applied with outstanding success) is used extensively as poultry feed, fertilizer, et cetera and is made by cooking, pressing, and disintegrating fish or fish scrap and drying the resulting pulp. The pulp consists of fragments of both bone and flesh, which have different apparent densities and which deteriorate markedly in heretofore customary drying operations. Operating problems involved in fish meal drying, especially as conducted heretofore in rotary driers and the like, include severe odor nuisance, marked fire hazard, low thermal efficiency and scorching or burning of protein and fat particles with consequent impairment of quality and yield. Product problems include poor color, diminished food and vitamin contents, a tendency to cake and harden upon cooling, uneven moisture content, and a tendency towards spontaneous combustion, the latter being attributable to the oxidation of drying oils initiated in the drying operation and continuing in the stored product.

As a result of my investigations, I have developed apparatus for and methods of drying which solve the operating problems of fish meal drying with consequent reduction in operating cost. Practice of the invention results in a higher total yield of improved fish meal having better color, more uniform moisture content, higher food value and less tendency to combust spontaneously or to cake during storage. Vitamin content is probably also improved.

In accordance with my invention, I dry a substantially horizontal and relatively shallow bed of fish meal or other finely divided material of relatively low bulk density, by passing hot gas upwardly through the bed transverse to its major dimension, the pressure and velocity of the rising gas being so correlated to the material of the bed and to its depth, that the material is buoyed sufficiently to permit it to progress horizontally through the bed like a liquid from its point of entry to a discharge point, the flow being occasioned by the "head" of the stream of material entering the bed.

In other words, the velocity and pressure of the rising gas are so regulated that the tendency of the material to repose at an angle to the horizontal is substantially overcome. Thus the pressure differential between the zone underlying the bed and one immediately overlying it may be so controlled that it overcomes the resistance of the maximum thickness of material in the bed, this differential being maintained even though the bed be temporarily much thinner at another point. At the same time, the velocity of the gas rising through the bed is so regulated that the tendency to repose is substantially overcome.

The pressure differential required to overcome the resistance of the bed to gas passage would ordinarily be accompanied by a velocity four to eight times that required to overcome the tendency of the material to repose, and the correlation of velocity and pressure to produce the "liquid" like flow through the bed is an important feature of the invention.

The velocity of the rising gas is reduced (preferably quite abruptly) at the level at which it escapes from the bed, for example by an increased passageway for the rising gas. This reduction in velocity tends to prevent the solid particles from being carried upwardly out of the bed and thus reduces dusting, preserving a bed of relatively uniform thickness in the drying zone.

The hydraulic analogy expressed above is not a complete one, for the bed does not act as a true liquid except in the sense that it progresses steadily to the discharge point under the force of the entering stream, provided that the velocity and pressure of the rising gas current are correctly correlated to the particular material and its proper bed depth for efficient drying. There is a tendency for the formation of blow holes in the bed, with consequent by-passing of the gas current. The resulting decrease of bed depth at the points where blow holes occur results in decreased thermal efficiency, and with many materials it is desirable to impart horizontal agitation or raking, preferably only to the surface of the bed. Blow holes are thus prevented from forming or at least sealed as fast as they are formed. The agitation may be conducted back and forth either longitudinally of the direction of flow through the bed or transverse thereto, but the former motion is to be preferred. It should be noted, however, that the raking does not aid materially in moving solids through the bed, since it may be and preferably is conducted only adjacent the surface and more or less equally in opposite directions.

I have discovered that the process of the invention operates satisfactorily even though the gas rising from the bed is just above the dew point, i. e. almost saturated at the prevailing temperature and pressure. This fact permits attainment of very high thermal efficiency. So I prefer to maintain the temperature of the air entering the bed from the bottom at a point but slightly in excess of that necessary to maintain gas leaving the bed in the moisture saturated condition. However, similar results can be obtained by adjusting the bed depth to produce an exhaust gas which is moisture saturated. Either control method permits the drying to be conducted both rapidly and at low temperatures with minimum injury to the product.

In the case of fish meal, such drying with a current of air entering the bed at 160° to 190° F. and leaving the bed at temperatures slightly above 100° F. gives (in a matter of five or ten minutes) a higher yield of material which is lighter and of more uniform color than that heretofore obtained commercially. Moreover, the product is improved through a higher food value. Lastly, the product displays much less tendency towards spontaneous combustion and caking or hardening during storage, even under adverse conditions, and probably has a higher vitamin content as well.

For products having particle size and bulk density approximating that of fish meal, the current of hot gas (say air) should pass through the bed at velocities ranging from about 800 to about 1000 feet per minute and then be reduced rapidly to velocities in the neighborhood of 300 ft./minute or less. The foregoing figures will, of course, vary with bulk density and particle size of the material, but will serve for a large number of products.

The bed should be relatively shallow, a matter of inches in most cases, and the required differential gas pressure through the bed will depend upon its depth. The bed depth, as already indicated, may be varied to suit the material undergoing treatment by varying the level at which the dried material is removed, for example by adjusting the height of a tail gate or the level of the bottom of a pipe through which the dried material is sucked up.

The process of the invention may be conducted in a variety of apparatus, but I prefer to employ an elongated trough with a porous or perforated bottom which is maintained substantially level and stationary. In certain cases, it may be tilted slightly either toward its feed end or toward its discharge end to facilitate operation.

A chute continually feeds the material to be dried into one end of the trough, and as the material dries, it progresses through the bed to the opposite or discharge end under the "head" thus established.

The gas may be sucked or blown through the bed. Thus the diluted products of combustion of natural gas and air or stack gases from a waste heat boiler may be blown under pressure into and through a manifold underlying the perforated plate which supports the bed in the trough. Or the space above the trough may be closed and hot gas sucked up through the bed by a fan connected to the enclosure. Up to the level of the top of the bed, the trough sides should be relatively vertical or only slightly flared, but above that level, the gas velocity should be reduced rapidly, this being achieved conveniently by flaring the sides of the trough out abruptly, say at an angle of 60° or less with the horizontal. This provides a gas deceleration space above the bed.

The agitation of the bed surface required to prevent the formation of blow holes in beds of some materials, may be provided by a mechanically operated rake, preferably one having a horizontal reciprocating motion.

The perforated bottom is preferably so constructed that the perforations occupy about 1/8 to 1/4 of the total bottom area. In order to secure adequate gas velocity for properly buoying the bed, the perforations should be of substantial size, say in excess of the largest particles in the material under treatment. Holes 3/4" in diameter on 2 1/4" centers along lines 1 1/8" apart and staggered have proved satisfactory in the case of fish meal having particle sizes ranging from 1/2" or 1/4" down to 20 or even 40 or 80 mesh.

In some cases, the perforations may be smaller, say 1/8" diameter, provided that the ratio of open area to the total bottom area is such that a proper average gas velocity through the bed is provided when the differential pressure or the bed depth is adjusted to overcome the resistance of the bed to gas flow.

To prevent the material from dropping through the large perforations when gas current is turned off, it is desirable to place a fine screen (say window screen or the like) over the main perforated bottom. Such screen should have a large proportion of open area so as to interfere as little as possible with the jets forced up through the main bottom.

Preferably the bottom is composed of a plurality of perforated plates stacked one over the other with holes drilled to the same pattern in each plate. Means are provided for shifting one plate horizontally with respect to another, thus varying either the direction of the jets of gas or the effective perforated area, or both. Travel rate may be adjusted by adjusting jet direction.

In some cases, it may be desirable to provide adjusting means for varying slightly the angle which the main axis of the trough makes with the horizontal, but in the majority of cases the trough should be substantially level.

These and other aspects of the invention will be understood more thoroughly in the light of the following detailed description of its use in fish meal drying as illustrated in the accompanying drawings in which Fig. 1 is a schematic transverse section through a simplified form of the apparatus of the invention;

Fig. 2 is a longitudinal section through the same apparatus;

Fig. 3 is a longitudinal section through a more elaborate form of the drier of the invention arranged to operate under suction;

Fig. 4 is a cross-sectional elevation of the apparatus of Fig. 3 taken along the line 4—4;

Fig. 5 is an enlarged plan view of the perforated bottom of the apparatus of Figs. 1 and 2 or that of Figs. 3 and 4; and Fig. 6 is a longitudinal section through the screen of Fig. 5 showing the adjustment of the plates with respect to each other for the control of the rising jets of gas.

A general concept of the practice of the invention may be obtained from Figs. 1 and 2. These show a simplified structure comprising a trough 10 having a substantially level bottom 11 comprising three superposed perforated plates 11A, 11B, 11C all drilled to the same pattern. These plates are longitudinally adjustable with respect to each other so that the effective perforated area and the direction of jets originating therein may be varied. A fine open screen 12, say a piece of window screen, overlies the perforated plates to prevent a bed 13 of granular material, say fish meal, to be dried from dropping through the perforations in the plates when the apparatus is shut down or the current of gas is turned off.

The sides of the trough are vertical up to the level of the top of the bed. At this point they flare out abruptly at 30° to the vertical to form a gas deceleration zone 14.

The gas deceleration zone may be enclosed in a settling chamber to which a fan or the like is connected if desired.

Finely divided material to be dried, say fresh fish meal, drops or slides continuously into the feed end of the trough down a steeply sloping feed chute 15. The bed extends along the trough to a discharge gate 16 at the other end. This gate is adjustable as to height and during operating a stream 17 of dried material is discharged over it continuously. The depth of the bed can be regulated by raising or lowering the discharge gate.

Warm gas, say stack gas, is supplied under pressure to a manifold chamber 18, the top of which is formed by the perforated plates. The gas rises as a plurality of currents into and through the bed. The pressure and velocity of the rising gas in the bed is adjusted so that the material of the bed has no effective angle of repose and flows through the trough from the feed chute under the slight head supplied by the entering stream of undried material. Gas that is forced through the bed and has picked up its required moisture content is discharged from the system by conventional means (not shown).

In order to inhibit blow hole formation in the bed with consequent by-passing, a mechanical rake 19, provided with a plurality of blades, is disposed in the trough above the bed. The blades are oscillated longitudinally of the trough during operation and bite into the top of the bed sufficiently to exert a smoothing influence.

Figs. 3 and 4 illustrate a more complex form of the apparatus of the invention, but one which operates according to the same principle, although under suction.

Feed 20, say wet fish meal, drops from a conventional bin 21 through an emergency shut off gate 22 to a gas tight, positively driven star feeder 23 into a steeply sloping feed chute 24. The feed makes a slight pile 25 at the feed end which supplies sufficient head to cause the material to progress through the apparatus under the conditions of operation as a shallow moving bed 26 in a trough 27 (see Fig. 4).

The feed chute forms one end of a suction chamber 28 which is enclosed in a housing 29 of sheet metal or the like.

The trough is long and narrow with vertical sides 27A, 27B rising approximately to the level of the top of the bed where they are joined respectively to flaring sides 30A, 30B of the housing. These sides flare outwardly at angles of approximately 30° with the vertical or 60° with the horizontal, and then extend vertically for a short distance to the point where they join the top 31 of the housing. A gas deceleration zone 32 occupies the space above the bed between the flared sides.

The bottom 33 of the trough is flat and approximately level and is composed of three superposed plates 33A, 33B, 33C. These plates are perforated to the same pattern, say with ¾" diameter holes on 2¼" centers along parallel rows spaced from each other by 1⅛", with alternate rows of holes staggered by 1⅛". These plates, as described hereinafter with reference to Figs. 5 and 6, are movable longitudinally with respect to each other so that the effective size and direction of the passages through the three plates may be varied to suit particular operating conditions. A piece of fine fly screen 34, i. e. with wires of about 24 gauge and openings of about $\frac{1}{16}$", overlies and rests on the main perforated bottom.

The perforated plates form the top of a long chamber 35 having downwardly flaring sides 35A, 35B and an open bottom. This open bottom is suspended a short distance above a base 36 upon which an elongated gas burner 37 rests. The burner extends parallel with the main axis of the trough. Vertical sides 38A, 38B extend from the base well up the housing but are separated from the sides of the housing proper by small gaps 39A, 39B. Air to be heated by the gas burner 37 is sucked downwardly through the gaps along the outside of the lower portion of the housing proper, thus coming into counter current indirect heat exchange relationship with the exhaust gas in the deceleration space within the housing. After being heated by the flame at the gas jet, this air is sucked upwardly through the perforated plates and the bed into the gas deceleration space and thence out of the top of the housing through an exhaust pipe 41 connected with a suction fan of conventional type and a cyclone collector, neither of the latter being shown.

Gas velocities in the deceleration space within the housing may be adjusted by means of a longitudinally extending louver 42 comprising a series of plates disposed in echelon with their axes of rotation running crosswise to the main axis of the shell or chamber. Each of the several plates comprising the louver may be adjusted individually so as to regulate the draft throughout the apparatus and assure that proper velocity conditions occur throughout the length.

The raking mechanism of the apparatus of Fig. 3 is suspended from rails 43, 44 within the chamber below the louver. The rake assembly, which comprises a frame 47 on the bottom of which are hung a series of short transverse rakes 48, is hung on the rails and slides longitudinally thereon.

To prevent caking of the wet material at the inlet end of the apparatus, a box 49 is fastened to the end of the rake and completely fills the cross section of the trough at the feed end down to the level of the perforated bottom. This box is reciprocated within a matching exterior chamber 50 on the end of the main housing by means of a conventional cam mechanism (not shown) connected to a reciprocating rod 51. Were it not for this box construction at the end of the apparatus, the rake would tend to press wet fish meal against the end of the housing and cause it to form slabs.

Passing now to a consideration of the discharge end of the apparatus, it is provided with a discharge suction pipe 52 rising vertically from the top of the housing. An adjustable sleeve 53 is provided on the bottom of the suction discharge pipe, and its level may be adjusted to vary the height of the bed. Thus the adjustable sleeve 53 serves the same purpose as the adjustable tail gate 16 in the apparatus of Figs. 1 and 2.

To insure that proper conditions for sucking up of the dried material are maintained at the discharge end of the apparatus, independent means are provided for adjusting perforated plate space at this point. Thus the main perforated plates 33A, 33B, 33C terminate just ahead of the suction pipe extension and two other perforated plates 54A, 54B extend through the rear end of the housing. They are perforated to substantially the same pattern as the main plates, but may be adjusted independently by means of levers 55A, 55B or other adjusting means, such for example as turn screws.

The discharge pipe 52 leads through a suction fan (not shown) to a dust collector of conventional type, say a cyclone (not shown).

As already indicated it may be necessary to adjust the longitudinal position of the main plates 33A, 33B, 33C with respect to each other. This can be accomplished by adjusting means such as levers 56C, 56D, 56A. These levers are attached to the respective plates at the head end of the apparatus. Turnscrews or other longitudinal adjusting means may be substituted for the levers if greater mechanical advantage is desired.

As already indicated, it may be desirable at times to adjust the level of the longitudinal axis of the apparatus so that the perforated plates slope either upwardly or downwardly. This may be done by means of a height adjusting jack 57 disposed at the tail end of the apparatus and supporting it at this point, there being a hinge (not shown) at the other end of the apparatus.

The perforation pattern of a preferred form of bottom is shown in Fig. 5. It will be observed that there are parallel rows 60, 61, 62 of holes extending longitudinally of the plate. These rows may be spaced about 1⅛" from each other with the holes in each row spaced on 2¼" centers or say double the distance between rows. Alternate rows of holes are staggered with respect to each other by the same distance as that between row centers, i. e. 1⅛".

The adjustment of the plates to change effective area and also jet direction is illustrated in Fig. 6, wherein the intermediate plate 33B is shown offset longitudinally with respect to the others, thus changing the effective open area of the combination.

The operation of the apparatus of Figs. 3 and 4 is as follows:

Wet feed is passed through the rotating star feeder continuously to the feed chute down which it drops to the feed end of the bed. The weight of the entering feed forces the bed along the feed trough under the continuous buoyant effect of carefully adjusted currents of warm air sucked upwardly into the bed in the trough and thence into the gas tight housing. The warm current of air dries the material of the bed. Due to the expanded cross section of the chamber immediately above the trough, the velocity of the gas decelerates markedly in this region, thus preventing the bulk of the material from leaving the bed. However, despite the reduction of the velocity of the gas due to deceleration effect, a small proportion of dried fines may be pulled up out of the bed. Some of this settles again. The balance is sucked out with the exhaust gas through the outlet pipe 41 and thence to a common or an independent dust collection system as already indicated.

Dried material which reaches the end of the trough is sucked up through the exhaust pipe 52 and sent to a conventional dust collector as already described. In order that the suction effect underneath the bed at the discharge end shall be stronger than throughout the bed proper, the two perforated plates at the discharge end are usually so adjusted to give a relatively large effective perforated area.

With some materials it may be desirable to tilt the mechanism longitudinally, either toward or away from the discharge end, and this can be accomplished very simply by means of the jack.

When the apparatus is in operation, it is desirable to set the individual louver plates to produce uniform velocity of gas rising to the exit.

The following specific example on a pilot scale illustrates the performance of the apparatus of the invention in drying fish meal:

The trough employed was 3" wide and about 12' long with vertical sides 4" high, flaring out above this level into a deceleration chamber. The bottom of the trough was constructed as described with two longitudinal rows of ¾" diameter holes on 2¼" centers, the rows being 1⅛" apart and staggered as shown in Fig. 5. About ⅙ of the total bottom area was open.

Fresh fish meal ranging in particle size from ¼" to 40 mesh, but with a few fragments as large as ½", and with a small proportion of material ranging from 40 to 80 mesh, was fed at the head end of the trough. Its original moisture content ranged from 50 to 55% by weight, and its original bulk density, i. e. its specific gravity without allowance for voids was 0.65.

The gas employed in drying was produced by burning natural gas in excess air. It was forced into the bed at the rate of 2000 to 3000 cu. ft./min., the temperature of the gas being 180° to 190° F. The gas pressure was 3.5 inches of water.

Gas passed through the perforations when the trough was empty at a velocity of from 6000 to 7000 ft./min., but with a bed of four inches thickness, the velocity of the air was reduced to 800 to 1000 ft./min. The open area was ⅙ to ⅐ of the total plate area.

The velocity was reduced rapidly immediately above the bed to a maximum of 300 ft./min.

The air left the bed at a temperature of 105° to 110° at the feed end and 125° to 135° F. at the discharge end of the trough. Under the particular conditions of operation, the gas at a temperature of 105° F. was almost completely saturated. In other words, the dew point was only slightly less than 105° F.

The pressure drop through a four to six inch bed is only about three inches of water when the apparatus is hot, although in starting up with cold air the resistance offered by the perforated plates may be as high as four inches of $H_2O$.

The average treatment time, i. e. the time that an average particle took to travel through the equipment in the foregoing example, was from five to ten minutes, during which its moisture content was reduced from an initial figure of 55% by weight to a final content of 8% to 10% by weight.

The average output of the above described specific example was about 200 lbs. of dried material per hour, or about 60 lbs./hr./sq. ft. of trough area.

The bulk density of the final product was about 0.3. The product was much lighter and of more uniform color than that produced in a rotary kiln. Moreover, the total yield and the food value of the product are much higher, and there was also a probable improvement in vitamin content. The product manifested no tendency towards spontaneous combustion or caking or hardening upon standing, even under unventilated conditions. This indicates that it is chemically as well as physically different from conventional dried fish meal.

No difficulty was encountered in holding moisture content in the final product substantially constant at any desired point in a 6–10% range.

I have found that for materials having dry bulk densities of the order of 0.2 to 0.4, the velocity of the gas through the bed should be about 800 to 1000 ft./min. for any practicable range of bed depth. For heavier material this figure should be raised slightly and conversely in the case of very light materials. In operating the apparatus, effective screen openings are adjusted in correlation with the available pressure to give such a velocity to the gas rising through the bed. With high velocities dusting losses increase, and longitudinal flow of solids is not improved. At lower velocities, the requisite buoyancy which permits liquid-like flow is not obtained.

Adjustment of effective hole area in the trough bottom is accomplished by longitudinally offsetting the lowest plate with respect to the middle plate as shown in Fig. 6. The lowest plate preferably is made thinner than the two upper plates so that the principal effect of offsetting it is to reduce the effective hole area. Change of direction of jets of gas rising through the plates is best accomplished by offsetting the upper plate with respect to the middle one. By shifting the upper plate forward a slight forward moment may be imparted to the gas jets, and by shifting it backward the reverse effect is obtained.

In practice both upper and lower plates are adjusted until optimum operating conditions are obtained. Sometimes a slight backward moment of the jet is desirable; sometimes a slight forward impulse.

Optimum inlet and exhaust gas temperatures will depend upon the nature of the material being dried and the rate at which it is fed. Generally speaking, with perishable materials, an effort should be made to keep inlet temperatures as low as practicable without completely saturating the exit gas. This is advantageous from the standpoint of protecting the product and also from the standpoint of thermal efficiency.

It will be apparent, from the low temperature and high moisture content of the exhaust in the foregoing specific example, that a thermal efficiency of a high order is obtainable together with a short treatment time. If desired, some increase in thermal efficiency may be obtained by recirculating part of the gas leaving the bed near the discharge end of the trough. However, the thermal efficiency of the apparatus is already high, and in many cases, the economies obtainable do not justify additional complexities in apparatus or procedure.

One of the most important features of the invention in the fact that the flow of drying gas is transverse to the movement of the material to be dried. This permits a much higher rate of drying than is obtainable either in concurrent or countercurrent flow of the solids and gas.

I claim:

1. In drying finely divided fish meal of a bulk density of less than 1, the improvement which comprises flowing a stream of the wet fish meal on an approximately level surface and forming thereon a bed of substantially uniform depth, passing a current of relatively dry gas upwardly throughout the bed, abruptly reducing the velocity of the rising gas at the level at which it passes out of the bed, causing the material to flow through the bed from the point where the stream enters the bed to a discharge point under the "head" of the entering stream, and regulating the flow of dry gas through the bed so that the gas rising in the bed has a velocity of approximately 800 to 1000 ft. per min. at a temperature of between 180° F. to 190° F. and under a pressure of approximately 3.5 inches of water and controlling the depth of the bed so that the gas leaving the surface of the bed will be at a temperature of about 105° F. to about 135° F., thereafter reducing the velocity of the gas to about 300 ft. per min.

2. In an apparatus for drying finely divided solid material, the combination which comprises an elongated trough having an approximately level perforated bottom comprising a plurality of superposed perforated plates being perforated in substantially the same pattern and being longitudinally slidable in relation to each other, means for separately sliding each of the perforated plates, a feed chute for the wet material at one end of the trough, means for withdrawing the dried material at the other end of the trough, means for passing a current of warm gas up through the stacked perforated plates, and an overlying bed of the material being dried, and means for abruptly reducing the velocity of the rising current of gas immediately it leaves the bed.

3. In an apparatus for drying finely divided solid material, the combination which comprises an elongated trough having a perforated bottom that is approximately horizontal longitudinally, a feed chute for introducing the wet material by gravity at one end of the trough, means for withdrawing the dried material at the other end of the trough, means for passing a current of warm gas up through the perforated bottom and an overlying bed of the material being dried, means for abruptly reducing the velocity of the rising current of gas immediately it leaves the bed comprising a chamber with walls sloping towards the trough and of increasing cross-section above it, a rake member supported in the chamber above the bed and being provided with a plurality of depending teeth projecting into the upper surface only of the bed and means depending from the rake member and spaced from the depending teeth at the inlet end of the apparatus and being adapted to oscillate with the rake so as to agitate the entering wet material at the inlet end of the apparatus.

4. In an apparatus for drying finely divided solid material, the combination which comprises an elongated trough having an approximately level perforated bottom comprising a first group of three superposed perforated plates being perforated in substantially the same pattern and longitudinally slidable in relation to each other, a second series of perforated superposed plates slidably mounted adjacent the discharge end of the apparatus so as to form a continuation of the perforated bottom, separate means for sliding the plates in each of the series of plates, a feed chute for the wet material at one end of the trough, means for withdrawing the dried material at the other end of the trough, means for passing a current of warm gas up through the perforated bottom and an overlying bed of the material being dried, and means for abruptly reducing the velocity of the rising current of gas immediately it leaves the bed above the first series of superposed perforated plates.

5. In an apparatus for drying finely divided solid material, the combination which comprises an elongated trough having a perforated bottom that is approximately horizontal longitudinally, a feed chute for introducing wet material by gravity at one end of the trough, a discharge tube projecting vertically upwardly from the trough at the other end of the trough, means for passing a current of warm gas up through the perforated bottom and an overlying bed of the material being dried, means for abruptly reducing the velocity of the rising current of gas immediately it leaves the bed comprising a chamber with walls sloping toward the trough and increasing cross-section above it, and means for passing a stronger current of warm gas up through the perforated bottom adjacent the said other end of the trough so as to cause said gas to carry the dried material up the discharge tube.

6. An apparatus according to claim 5 wherein the discharge tube is provided at its lower end with a vertically adjustable sleeve whereby the level of the bed may be controlled.

7. In apparatus for drying finely divided solid material, the combination which comprises an elongated trough, a plurality of superposed plates with matching perforations affixed to said trough and forming the bottom thereof, means for shifting one plate horizontally with respect to another, a feed chute for the wet material at one end of the trough, means for withdrawing the dried material at the other end of the trough, means for passing a current of warm gas up through the perforated bottom and an overlying bed of material being dried, means for abruptly reducing the velocity of the rising gas immediately it leaves the bed, and means for varying the effective area of the perforations of the bottom.

8. Apparatus according to claim 7 wherein the perforated plates are shiftable with respect to each other in the direction of travel of the material through the bed.

9. Apparatus according to claim 7 in which the bottom comprises at least three superposed plates with matching perforations, and means for moving the uppermost and lowermost of the three plates horizontally with respect to the intermediate plates.

10. Apparatus according to claim 7 in which a fine open screen is disposed over the perforated bottom to prevent particles of material from dropping into the bed when the current of gas is interrupted.

PAUL A. SHAW.

REFERENCES CITED

The following references are of record in the file of this patent:

UNITED STATES PATENTS

| Number | Name | Date |
|---|---|---|
| 394,714 | Nelson | Dec. 18, 1888 |
| 1,019,958 | Hannam et al. | Mar. 12, 1912 |
| 1,213,962 | Siler | Jan. 30, 1917 |
| 1,459,326 | Dow | June 19, 1923 |
| 1,472,314 | Webster | Oct. 30, 1923 |
| 2,220,193 | Ahlmann | Nov. 5, 1940 |
| 2,245,881 | Vissac | June 17, 1941 |
| 2,270,903 | Rudbach | Jan. 27, 1942 |
| 2,316,664 | Brassert et al. | Apr. 13, 1943 |
| 2,346,500 | Moore | Apr. 11, 1944 |
| 2,371,619 | Hartley | Mar. 20, 1945 |
| 2,404,944 | Brassert | July 30, 1946 |
| 2,436,157 | Westling | Feb. 17, 1948 |

OTHER REFERENCES

Convection Drying and Drying Calculations, by V. P. Victor, Heating and Ventilating, December, 1944, pages 67 to 82.